(12) United States Patent
Clapper

(10) Patent No.: US 6,862,020 B2
(45) Date of Patent: Mar. 1, 2005

(54) PROVIDING A USER-INPUT DEVICE

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 09/871,270

(22) Filed: May 31, 2001

(65) Prior Publication Data

US 2002/0180700 A1 Dec. 5, 2002

(51) Int. Cl.⁷ .................................................. G09G 5/00
(52) U.S. Cl. ..................... 345/179; 345/173; 178/19.01
(58) Field of Search ................................ 345/173–183; 179/18.01–19.07; 178/18.01–19.07

(56) References Cited

U.S. PATENT DOCUMENTS

| 4,777,329 A | * | 10/1988 | Mallicoat | 178/19.02 |
| 5,357,265 A | * | 10/1994 | Searby et al. | 345/179 |
| 5,475,401 A | * | 12/1995 | Verrier et al. | 345/179 |
| 5,646,650 A | * | 7/1997 | Miller et al. | 345/179 |
| 5,767,843 A | * | 6/1998 | Wagner et al. | 345/179 |
| 6,028,595 A | * | 2/2000 | Shiga | 345/173 |
| 6,104,387 A | * | 8/2000 | Chery et al. | 345/179 |
| 6,184,873 B1 | * | 2/2001 | Ward et al. | 345/179 |
| 6,188,392 B1 | * | 2/2001 | O'Connor et al. | 345/179 |
| 6,474,888 B1 | * | 11/2002 | Lapstun et al. | 401/45 |
| 2002/0163510 A1 | * | 11/2002 | Williams et al. | 345/179 |

* cited by examiner

Primary Examiner—Regina Liang
(74) Attorney, Agent, or Firm—Trop, Pruner & Hu, P.C.

(57) ABSTRACT

An improved method and user-input device are provided. The user-input device comprises a housing having a first end and an opposite end. The user-input device further comprises a controller to indicate a position of the first end and the opposite end and to cause one or more pixels of a display device to activate based on the indicated position of at least the first end of the housing.

29 Claims, 8 Drawing Sheets

PROVIDING A USER-INPUT DEVICE

BACKGROUND

This invention relates generally to providing a user-input device, and, more particularly, to providing a peripheral device for identifying one or more pixels that may be illuminated.

Processor-based systems, which may include desktop computers, laptop computers, Internet appliances, and the like, have become popular over the years for a variety of reasons, such as improved performance and lower cost. As today's processor-based systems evolve into more robust and versatile systems, so are the peripheral devices, such as pointing devices, keyboards, and digitizing pens, which interface with these processor-based systems.

The improvements in the peripheral devices, however, may not adequately address some of the needs of users, such as artists or those who may otherwise have interest in art. For example, while conventional digitizer pad/pen devices may allow users to manipulate illumination of pixels on a display device, these devices may sometimes be limited in functions they provide and may not be user friendly.

Thus, there is a need to provide an improved user-input device.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION

Figure 1:
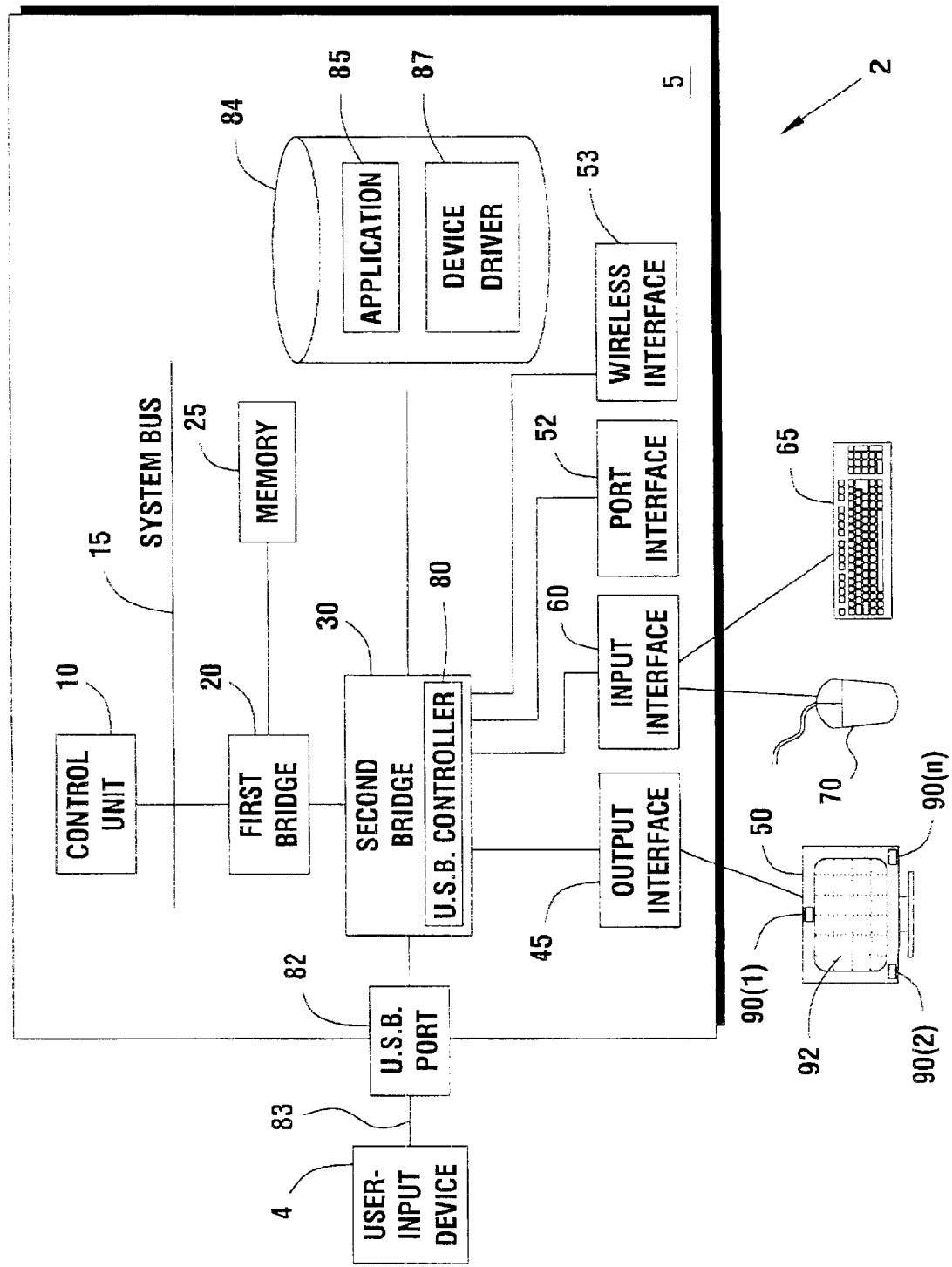
FIG. 1 is a stylized block diagram of a system having a user-input device coupled to a processor-based system, in accordance with one embodiment of the present invention.

Referring now to FIG. 1, a block diagram of one embodiment of a system 2 including a user-input device 4 communicatively coupled to a processor-based system 5 is illustrated. Examples of the processor-based system 5 may include a personal digital assistant, laptop computer, desktop computer, Internet appliance, and the like.

As described in more detail below, the user-input device 4, in one embodiment, may function similar to an airbrush, where, in one embodiment, selected pixels of a display device attached to the processor-based system 5 may be illuminated as the user employs the user-input device 4. Thus, in one embodiment, the pixels of the display device may symbolically represent "digital paint" while the screen of a display device may serve as the canvas.

The processor-based system 5 includes, in one embodiment, a control unit 10 that may be coupled to a system bus 15. A first bridge 20 may be coupled to the system bus 15, and to a memory 25, in one embodiment. The processor-based system 5, in one embodiment, includes a second bridge 30 that may be coupled to the first bridge 20. The second bridge 30 may be coupled to an output interface 45, in one embodiment. The output interface 45, for example, may be an interface to a display device 50. In one embodiment, the output interface 45 may be a video card. In one embodiment, the second bridge 30 may be coupled to a port interface 52, which may be an interface to a RS232 port (e.g., serial interface), parallel port, and the like.

The second bridge 30 may be coupled to an input interface 60, in one embodiment. The input interface 60, for example, may interface with a keyboard 65 that, in one embodiment, allows a user to enter text that may be received by the processor-based system 5, where the text may include alphabet characters, numeric characters, other displayable characters, or any combination thereof. In one embodiment, the input interface 60 may be an interface to a pointing device 70, such as a mouse, trackball, and the like.

The processor-based system 5, in one embodiment, may include a wireless interface 53 that is coupled to the second bridge 30. The wireless interface 53 may be an interface capable of communicating with other devices wirelessly using radio, infrared (IR), or other frequencies. The wireless interface 53 may include an antenna and a transceiver, for example. In one embodiment, the user-input device 4 may communicate using a radio frequency with the processor-based system 5 through the wireless interface 53, for example.

The second bridge 30, in one embodiment, may include a universal serial bus (USB) controller 80 that is capable of interfacing with the user-input device 4 through a USB port 82 over a USB cable 83. Although the user-input device 4 is shown interfacing with the processor-based system 5 via the USB port 82 in the illustrated embodiment, in alternative embodiments, the user-input device 4 may interface with the processor-based system 5 in other ways, such as through a serial port, parallel port, wireless, and the like.

The processor-based system 5, in one embodiment, includes a storage unit 84 that may be coupled to the second bridge 30. The storage unit 84 may include an application 85 (described in more detail below) that contains one or more executable instructions for allowing a user to use the user-input device 4, in one embodiment, in a manner similar to an airbrush. The storage unit 84 may, in one embodiment, have one or more device drivers 87 for devices such as the keyboard 65, display device 50, user-input device 4, and the like. Additionally, although not shown, an operating system for the processor-based system 5 may be resident in the storage unit 84.

The system 2, in one embodiment, includes one or more sensors 90(1–n) on the display device 50 for aiding in determining the position of the user-input device 4. In one embodiment, the position of the user-input device 4 may be made relative to the position of the display device 50. In one embodiment, the sensors 90(1–n) may aid in tracking the tip of the user-input device 4. Although the sensors 90(1–n) are shown mounted on the periphery of the display device 50, the sensors 90(1–n) may be placed in any other desirable location in an alternative embodiment. The number of sensors 90(1–n) employed may vary from one implementation to another. As described in more detail below, the sensors 90(1–n) may either transmit, receive, or both receive and transmit signals to and from the user-input device 4 to ascertain the position of the user-input device 4. In one embodiment, ascertaining the position of the user-input device 4 may include determining the position of both ends of the user-input device 4.

Instead of the sensors 90(1–n), the display device 50 may include, in one embodiment, a grid 92 (or other identifiable marking) that may aid in determining the position of the user-input device 4. In one embodiment, the grid 92 may be used in determining the position of the user-input device 4 relative to the display device 50. As described in more detail below, a sensor in the user-input device 4 may use the grid 92, in one embodiment, to indicate the position of the user-input device 4 relative to the display device 50 or a portion of the display area of the display device 50.

For clarity and ease of illustration, only selected functional blocks of the processor-based system 5 are illustrated in FIG. 1, although those skilled in the art will appreciate that the processor-based system 5 may comprise additional functional blocks. Additionally, it should be appreciated that FIG. 1 illustrates one possible configuration of the processor-based system 5 and that other configurations comprising different interconnections may also be possible without deviating from the spirit and scope of one or more embodiments of the present invention. For example, in an alternative embodiment, the processor-based system 5 may include additional or fewer bridges 20, 30. As an additional example, in an alternative embodiment, the output interface 45 may be coupled to the first bridge 20 directly. Similarly, other configurations may be possible.

Figure 2:
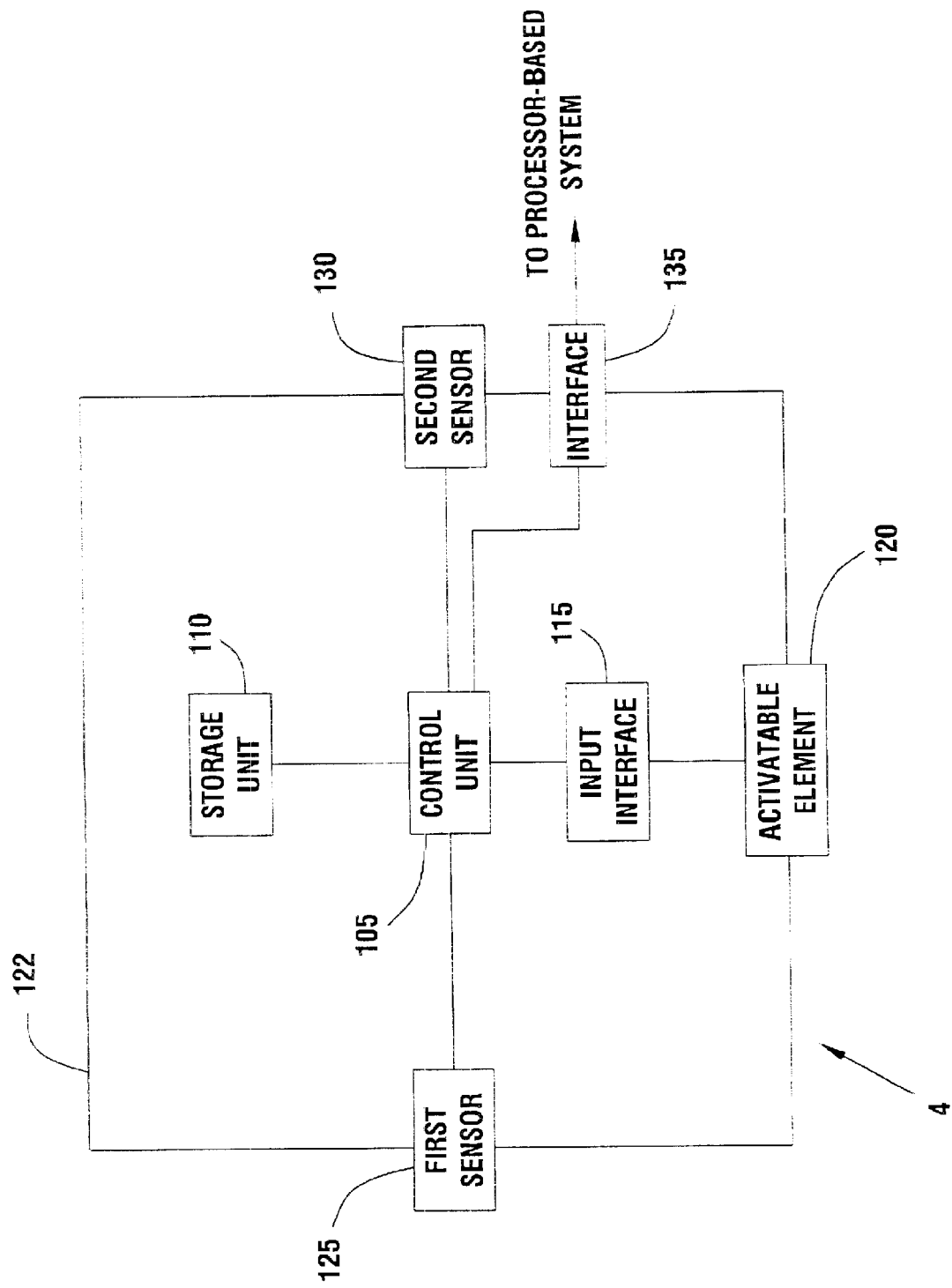
FIG. 2 is a stylized block diagram of the user-input device of the system of FIG. 1, in accordance with one embodiment of the present invention.

Referring now to FIG. 2, a block diagram of the user-input device 4 of FIG. 1 is illustrated, in accordance with one embodiment of the present invention. The user-input device 4 includes a control unit 105 coupled to a storage unit 110, in one embodiment. The user-input device 4, in one embodiment, includes an input interface 115 for an activatable element 120. The activatable element 120 may take one of many forms, including a depressable button, for example. In one embodiment, the activatable element 120, when selected, may activate the user-input device 4, or, when in an unselected state, may deactivate the user-input device 4. In one embodiment, the activatable element 120 may be an actuator button that may be pressure-sensitive, thereby allowing the processor-based system 5 to infer the "flow" of the "digital paint"

The user-input device 4, in one embodiment, includes a housing 122 having a first and a second sensor 125, 130 at opposite ends. The sensors 125, 130, in one embodiment, may be capable of assisting in providing information regarding the position or location of the user-input device 4 relative to the display device 50 of the processor-based system 5. This information, in one embodiment, is then relayed to the processor-based system 5 through an interface 135 of the user-input device 4. As described below, the sensors 125, 130 may be transmitters, receivers, or transceivers, in one embodiment.

The sensors 90(1–n) and 125, 135 may be complementary such that the sensors 125, 135 of the user-input device 4 and the sensors 90(1–n) of the processor-based system 5 work in concert to determine movements of the user-input device 4. For example, the sensors 90(1–n) may emit an ultrasonic signal, which the sensors 125, 130 (complementary sensors) in the user-input device 4 may receive. In one embodiment, the sensors 90(1–n), 125, and 130 may utilize ultrasonic, magnetic, or electrostatic sensor technologies. In one embodiment, the sensors 90(1–n), 125, and 130 may all be transceivers.

In one embodiment, the sensors 125, 130 may be ultraultrasonic transducers located on each end of the user-input device 4. The first sensor 125 may be capable of detecting distance of the user-input device 4 relative to the display device 50 based on acoustic reflection time. The position of each sensor 125, 130, and hence the position of the user-input device 4, may be determined, in one embodiment, via triangulation from one or more transmitting sensors 90(1–n) attached to the display device 50. In this manner, the position of the front end, as well as the orientation angle, of the user-input device 4 may be determined, in one embodiment. Determining the orientation of the user-input device 4, in one embodiment, may entail determining the orientation of the user-input device 4 in a three-dimensional space. In another embodiment, based on the sensors 125, 130, the movement of the front end, as well as the change in the angle, of the user-input device 4 may be determined, which may affect the "digital spray" effect.

In an alternative embodiment, the sensors 125, 130 may transmit signals that are received by the sensors 90(1–n). Using triangulation, in one embodiment, the position of each end of the user-input device 4 may be determined based on the received signals. In one embodiment, because the position of each end of the user-input device 4 may be determined, it may be possible to determine the orientation of the user-input device 4 relative to the display device 50. Tracking the movement of the sensors 125, 130 may allow the processor-based system 5 to calculate the velocity or speed of the front end of the user-input device 4. The position, orientation, and velocity/speed of the user-input device 4 may affect the "digital spray" (i.e., which pixels are illuminated, the intensity of the illuminated pixels, and so forth) of the user-input device 4.

The user-input device 4, in one embodiment, may include an interface 135 for interfacing with the processor-based system 5. The interface 135 may take one of several forms, depending on the desired implementation. For example, the interface 135 may interface with a USB port, a serial port, and a parallel port of the processor-based system 5. As an additional example, the interface 135 may wirelessly communicate with the processor-based system 5.

For clarity and ease of illustration, only selected functional blocks of the user-input device 4 are illustrated in FIG. 2, although those skilled in the art will appreciate that the user-input device 4 may comprise additional or fewer functional blocks, depending on the particular implementation. It should be appreciated that FIG. 2 illustrates one possible configuration of the user-input device 4 and that other configurations comprising different interconnections may also be possible without deviating from the spirit and scope of one or more embodiments of the present invention. For example, in an alternative embodiment, the user-input device 4 may include additional or fewer sensors 125, 130. Similarly, other configurations may be possible.

Figure 3:
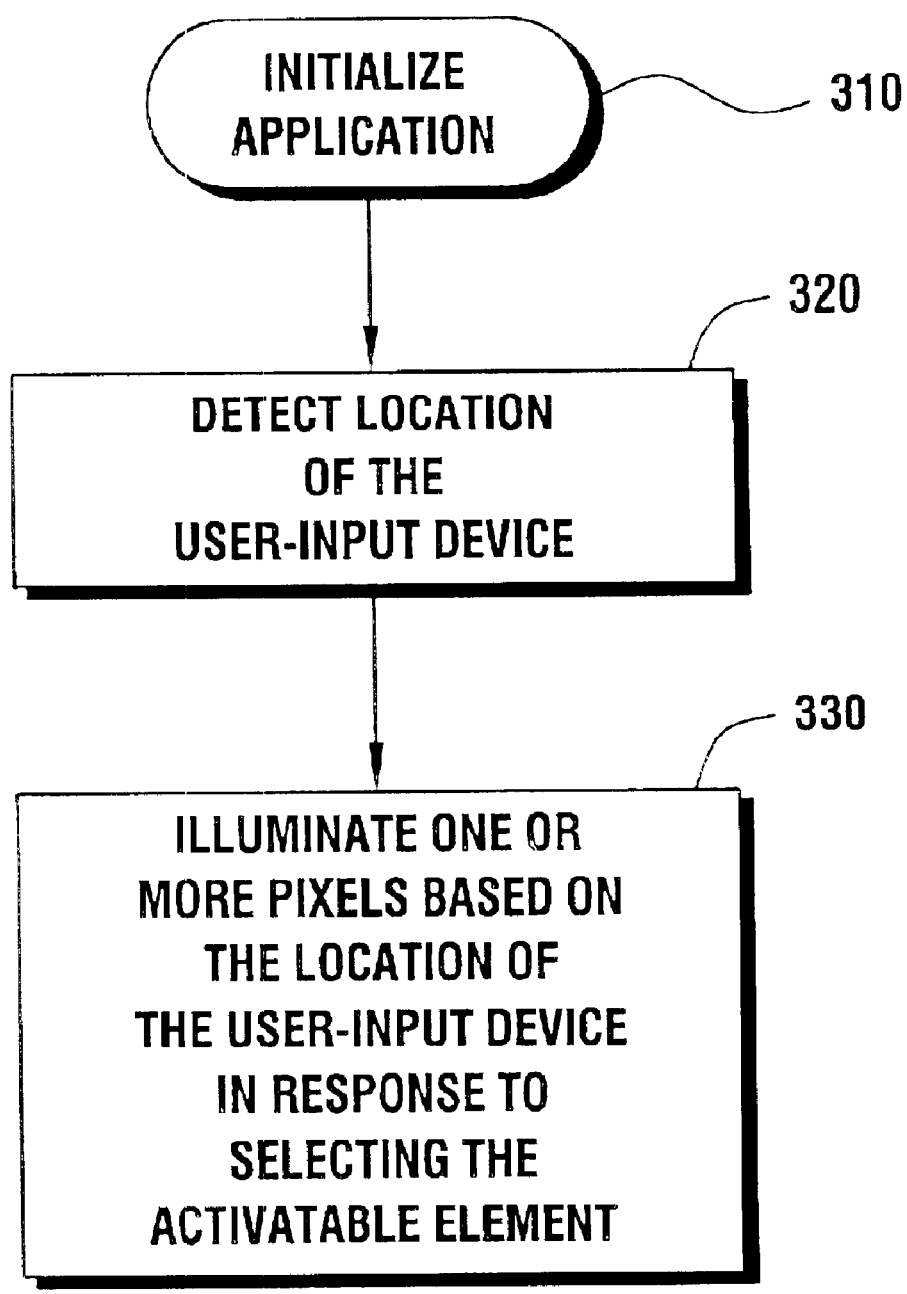
FIG. 3 is a flow diagram of a method that may be implemented in the system of FIG. 1, in accordance with one embodiment of the present invention.

Referring now to FIG. 3, a flow diagram of a method that may be implemented in the system 2 of FIG. 1 is illustrated, in accordance with one embodiment of the present invention. The application 85 (see FIG. 1) of the processor-based system 5 is initialized (at 310), in one embodiment. The location or position of the user-input device 4 is detected (at 320). In one embodiment, the position of the user-input device 4 may include determining the distance of the user-input device 4 relative to the display device 50. The position of the user-input device 4 may be accomplished using one of several ways described herein or otherwise known in the art, such as triangulation, optical sensing, and the like. In one embodiment, determining the position of the user-input device 4 may include determining the distance of the user-input device 4 from the display device 50.

The processor-based system 5 illuminates (at 330) one or more pixels of the display device 50 based on the location of the user-input device 4 in response to the user selecting the activatable element 120. Thus, upon selecting the activatable element 120, in one embodiment, the user may utilize the user-input device 4 like an airbrush, where the user-input device 4 provides an effect of "spray painting" (where the illumination of pixels may symbolically represent paint) onto a graphical user interface of the display device 50.

Figure 4:
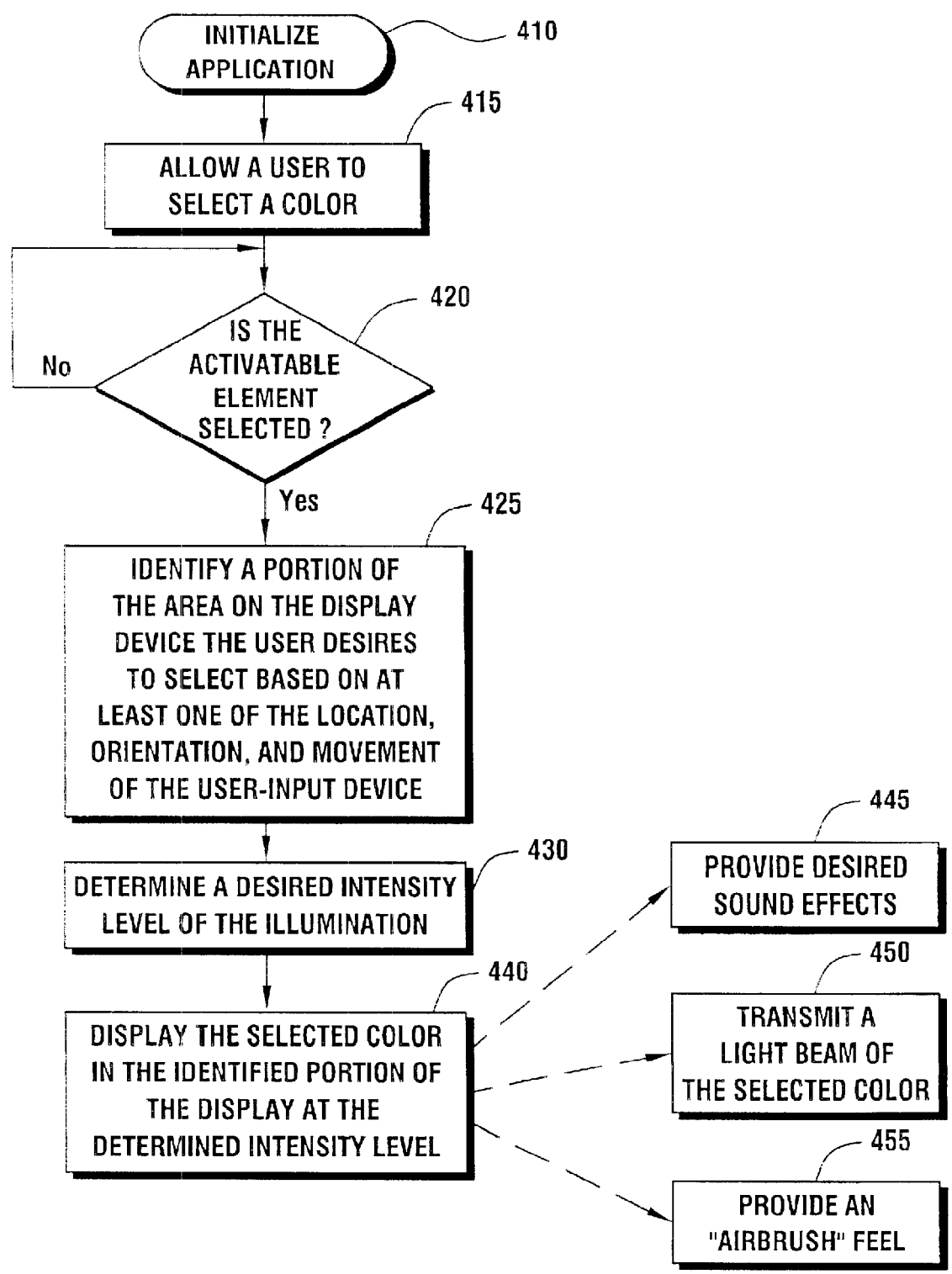
FIG. 4 is a flow diagram of an alternative method that may be implemented in the system of FIG. 1, in accordance with one embodiment of the present invention.

Referring now to FIG. 4, a flow diagram of an alternative embodiment of a method is illustrated. The user initializes (at 410) the application 85. The application 85, in one embodiment, allows a user to select a color to which the one or more pixels may be illuminated. The user may select the desired color from a selection of colors from a color palette, for example, on the display device 50 of the processor-based system 5. Alternatively, the user-input device 4 may have a selectable option that allows the user to choose the desired color. The processor-based system 5, in one embodiment, determines (at 420) if the user has selected the activatable element 120. Upon detecting the selection of the activatable element 120, the application 85 of the processor-based system 5, in one embodiment, identifies (at 425) a portion of the area on the display device 50 the user desires to select (e.g., digitally paint) based on at least one of the location, orientation, and movement of the user-input device 4.

The size of the identified (at 425) portion of the area on the display device 50 may depend, in one embodiment, on the location, orientation, and/or the movement of user-input device 4. For example, the "digital spray" of the user-input device 4 may have a larger coverage area when it is further (rather than closer) to the display device 50. With respect to the orientation, the angle of the user-input device 4 may affect the display area that may be covered by the "digital spray." Similarly, the movement of the user-input device 4 in front of the display device 50 may have some affect on the "digital spray" of the user-input device 4.

The processor-based system 5, in one embodiment, determines (at 430) a desired intensity level to which the pixels of the display device 50 are illuminated. The intensity level, in one embodiment, may depend on the amount of depression of the activatable element 120 (see FIG. 2). That is, in one embodiment, the more the user depresses the activatable element 120 the more intense the "digital spray," and vice-versa. Thus, similar to a conventional airbrush, the intensity of the "digital spray" may vary with the amount by which the activatable element 120 is depressed or to a level that it is selected. In an alternative embodiment, the intensity may be varied in any other desirable manner.

The processor-based system 5, in one embodiment, displays (at 440) the selected (at 415) color in the identified (at 425) portion of the display device 50 at the determined (at 430) intensity level. In one embodiment, as described below, an "actual" airbrush feel may be provided to the user. For example, in one embodiment, as the user utilizes the user-input device 4, one or more desirable airbrush-type sound effects may be provided by the user-input device 4, or, alternatively, by the processor-based system 5. In another embodiment, the user-input device 4 may transmit a light beam that is representative of the color of the "digital paint" that is selected (at 415) by the user. For example, when digitally painting with a red color, the user-input device 4 may emit a red light beam to indicate the color currently in use. In yet another embodiment, the user-input device 4 may provide an "airbrush" feel by projecting impelled air through an aperture on the front end of the user-input device 4. In one embodiment, one or more of the aforementioned features to simulate an "actual" airbrush may be integrated in the user-input device 4 using any of the above-described desirable combination.

It should be noted that the methods of FIG. 3 and 4 are illustrative only, and that, in other embodiments, additional or fewer steps may be employed. Moreover, selected steps of the methods of FIGS. 3 and 4 may be performed in an order other than that presented. For example, in an alternative embodiment, the processor-based system 5 may allow the user to select a color (e.g., step 415 of FIG. 4) after the user selects the activatable element 120 (e.g., step 420 of FIG. 4). Similarly, the sequence of other steps of the illustrated methods may be modified as desired from one implementation to another.

Figure 5:
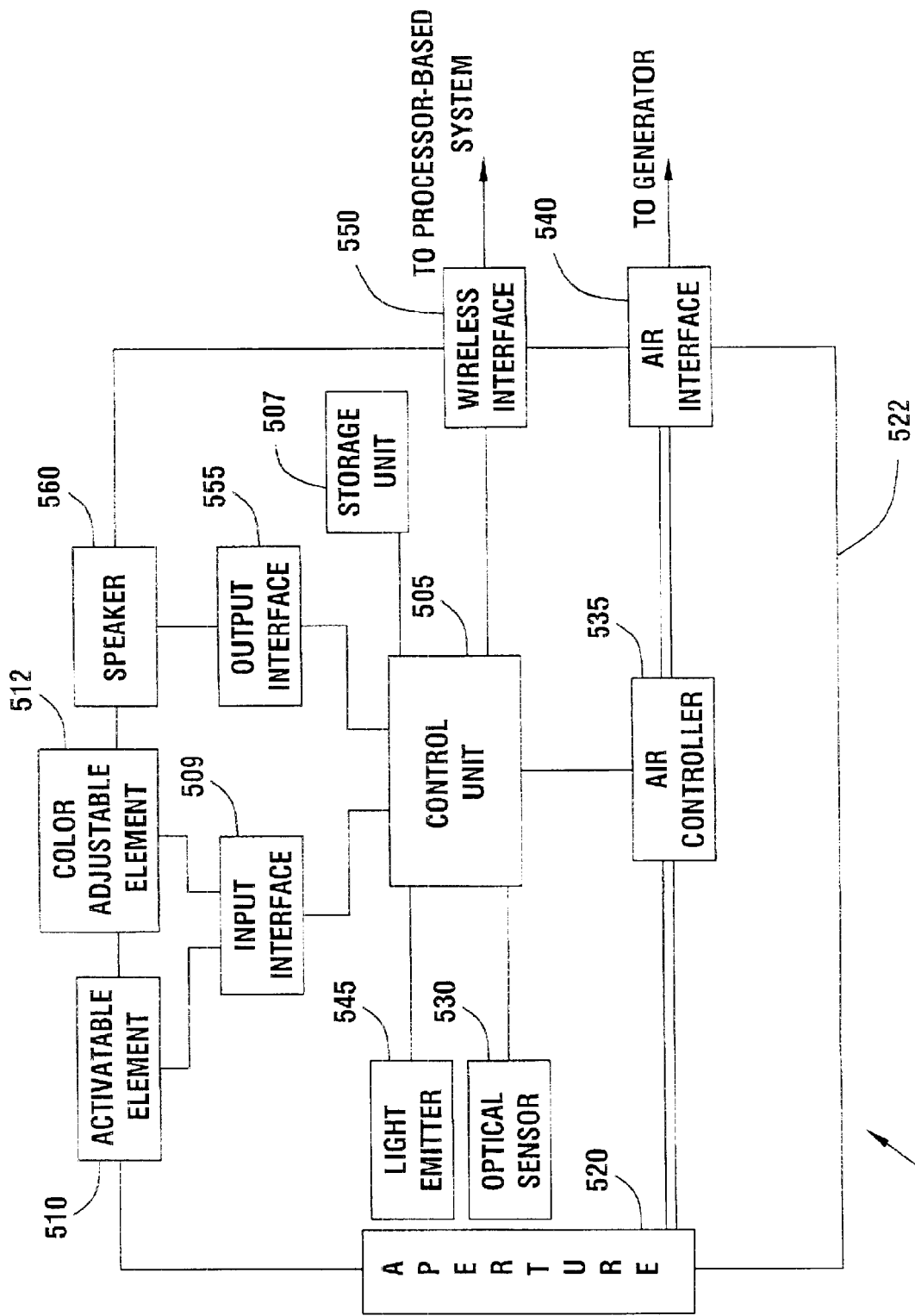
FIG. 5 is a stylized block diagram of an alternative embodiment of the user-input device of the system of FIG. 1, in accordance with one embodiment of the present invention.

Referring now to FIG. 5, a stylized block diagram of an alternative embodiment of the user-input device 4 is illustrated. The user-input device 4, in one embodiment, includes the control unit 505 coupled to the storage unit 507. In one embodiment, the user-input device 4 includes an activatable element 510 that may be coupled to the input interface 509, which may be further coupled to the control unit 505. In one embodiment, a color adjustable element 512 may be coupled to the input interface 509. The color adjustable element 512, in one embodiment, allows the user to select a desired color from a spectrum of colors, as described later in more detail.

The user-input device 4, in one embodiment, includes an aperture 520 on a first end of a housing 522. An optical sensor 530, in one embodiment, may be positioned to sense through the aperture 520. The position of the user-input device 4 may be determined, in one embodiment, by feeding back information that is "seen" by the optical sensor 530 to what is shown on the display device 50. In one embodiment, the grid 92 (see FIG. 1) (which may be a flashing grid) and/or a light emitting diode (LED) on the user-input device 4 may be used to confirm the location, by analyzing the image "seen" by the user-input device 4 and determining its position within the grid 92. In this manner, the velocity of the first end of the user-input device 4 may be determined, in one embodiment, in a similar way as it is for an optical mouse or trackball.

The user-input device 4, in one embodiment, includes an air controller 535 that may be coupled to the control unit 505, where the air controller 535 may provide a feel of actual air while the user-input device 4 is in operation. The air controller 535 may be capable of regulating airflow for the air that, in one embodiment, is received through an air interface 540 and provided through the aperture 520. In an alternative embodiment, the air stream may be provided through another orifice. In one embodiment, the air may be provided to the air interface 540 by an external generator (not shown). The user-input device 4 may have an internal generator, in one embodiment.

The user-input device 4, in one embodiment, includes a light emitter block 545 that is capable of transmitting a light beam through the aperture 520. In one embodiment, the color of the light beam may correspond to the color selected (at 415—see FIG. 4) by the user. In one embodiment, the light emitter block 545 may project a "cone" of light from the first end of user-input device 4, representing the volume of space that would typically be occupied by atomized paint.

The user-input device 4, in one embodiment, includes a wireless interface 550 through which the user-input device 4 may wirelessly communicate with the processor-based system 5. For example, the user-input device 4 may transmit the sensed information from the optical sensor 530 to the processor-based system 5 through the wireless interface 550.

The user-input device 4, in one embodiment, includes an output interface 555 coupled to the control unit 505. The output interface 555 serves an interface to a speaker 560. In one embodiment, the speaker 560 may produce sounds similar to those produced by a conventional airbrush, for example. In an alternative embodiment, the conventional airbrush-like sounds may be provided by the processor-based system 5.

Figure 6:
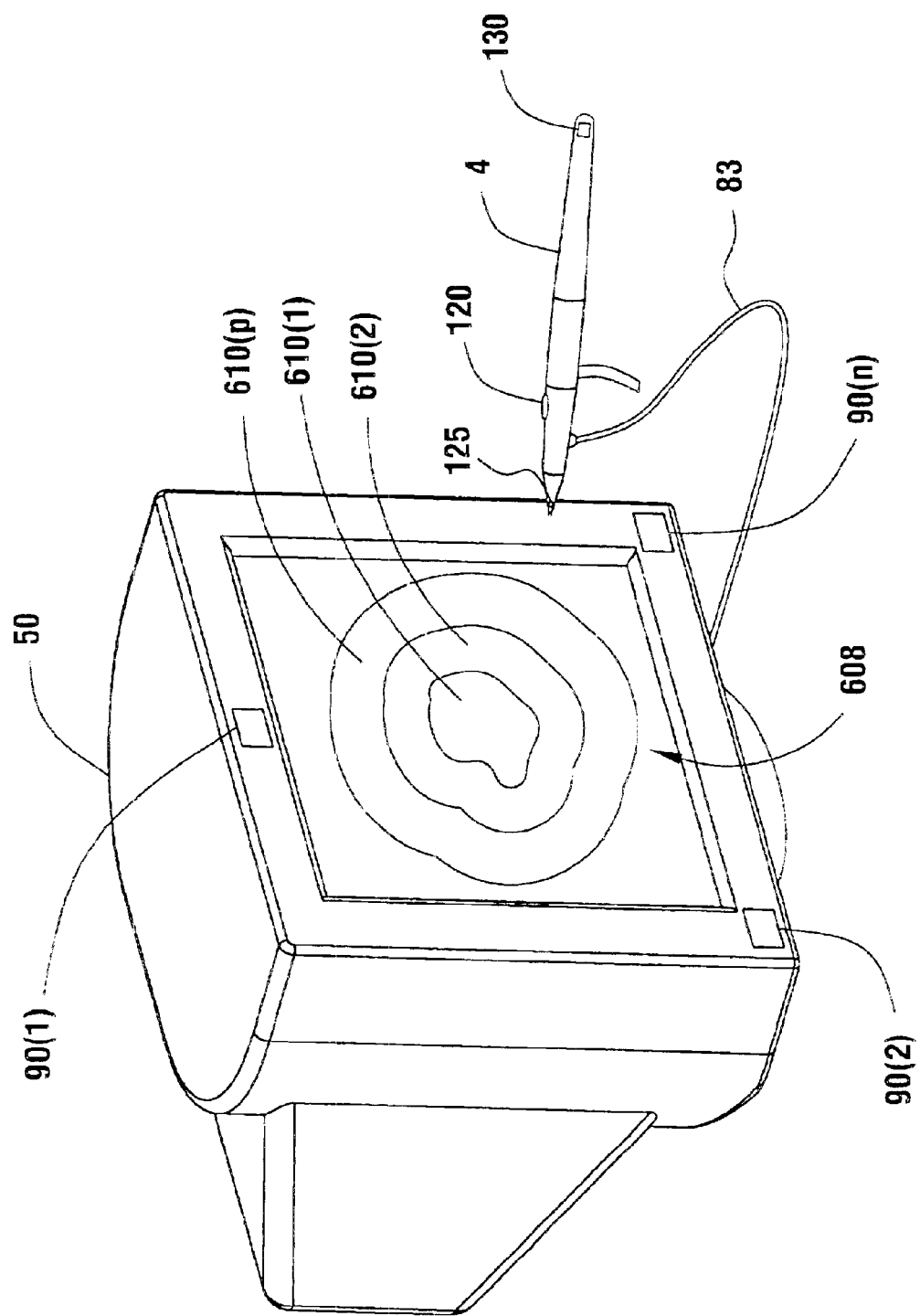
FIG. 6 illustrates an isometric view of the user-input device and a display device of the processor-based system of FIG. 1, in accordance with one embodiment of the present invention.

Referring now to FIG. 6, an isometric view of the display device 50 and the user-input device 4 is illustrated. In the illustrated embodiment, the user-input device 4 is coupled to the processor-based system 5 (see FIG. 1). The user-input device includes the activatable element 120, which is a push button in the illustrated embodiment.

An illustrative symbolic representation 608 of an image that may be created by the user-input device 4 is illustrated in the display device 50. The symbolic representation 608 may include a plurality of grades 610(1–p), signifying a multitude of colors and different shades of colors that may be created using the user-input device 4, in one embodiment. For example, the first grade 610(1) may represent a dark shade of a particular color, the second grade 610(2) may represent a slightly lighter shade of the particular color, and another grade 610(p) may represent even a lighter shade of that particular color. In another embodiment, the various grades 610(1–p) of the symbolic representation 608 of the image may represent different colors. The symbolic representation 608 may represent an airbrush-like image in one embodiment, where the resolution of certain portions of the image may depend on a particular user's style of airbrushing.

In the illustrated embodiment, the plurality of sensors 90(1–n) are mounted on the display device 50. The sensors 90(1–n) on the display device 50 and the two sensors 125, 130 on the user-input device 4 operate cooperatively to aid in determining the position of the user-input device 4. In one embodiment, the sensors 90(1–n) and 125, 130 may aid in tracking the position of the user-input device 5 as it is moved by the user in the process of creating an image.

Figure 7:
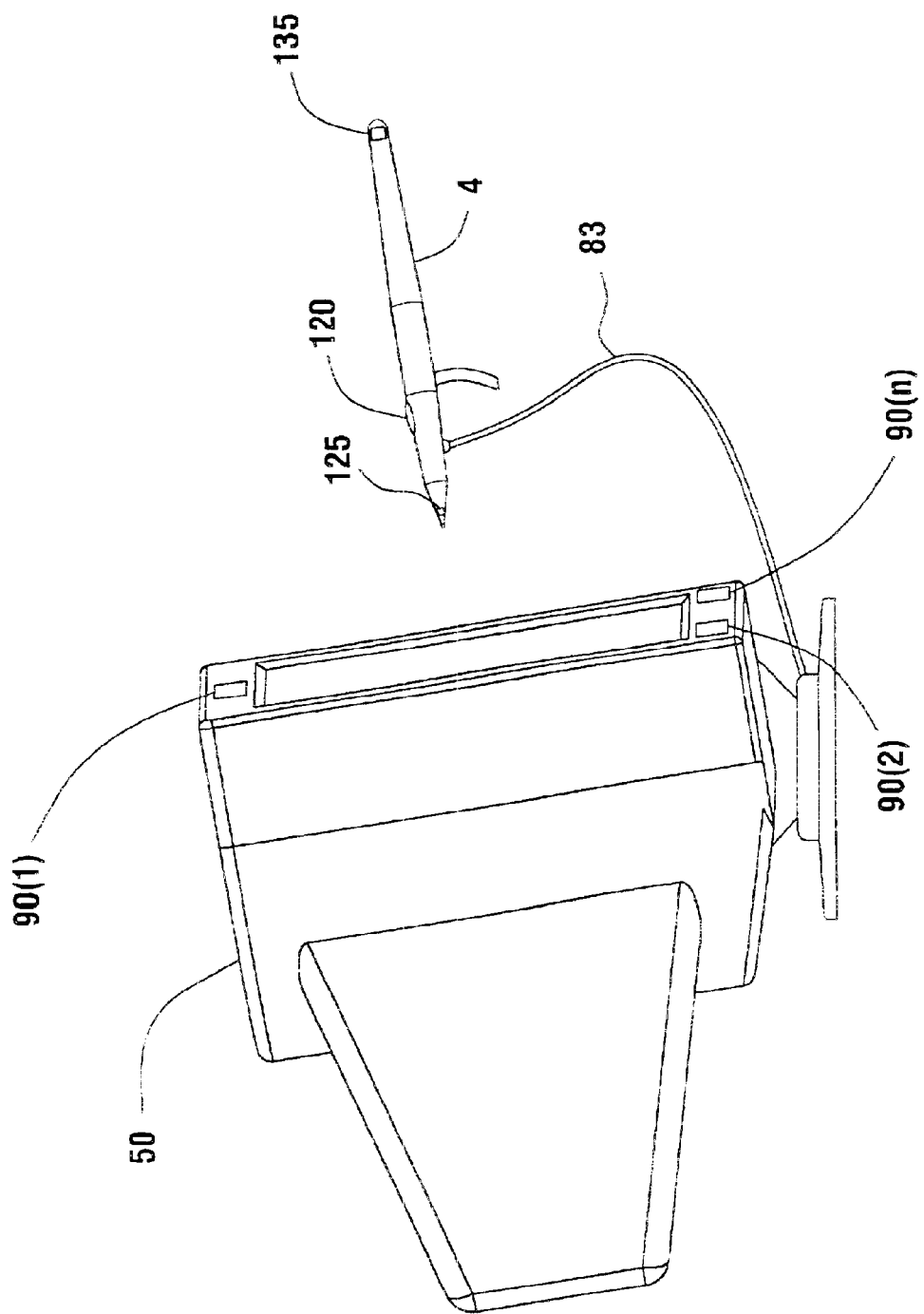
FIG. 7 is a side view of the illustration of FIG. 6, in accordance with one embodiment of the present invention.

Referring now to FIG. 7, a side view of the display device 50 of the processor-based system 5 and the user-input device 4 of FIG. 6 is illustrated, in accordance with one embodiment of the present invention. The user-input device 4, in one embodiment, may be maneuverable to any point within the four corners of the display device 50 to allow the user to create one or more desired images.

Figure 8:
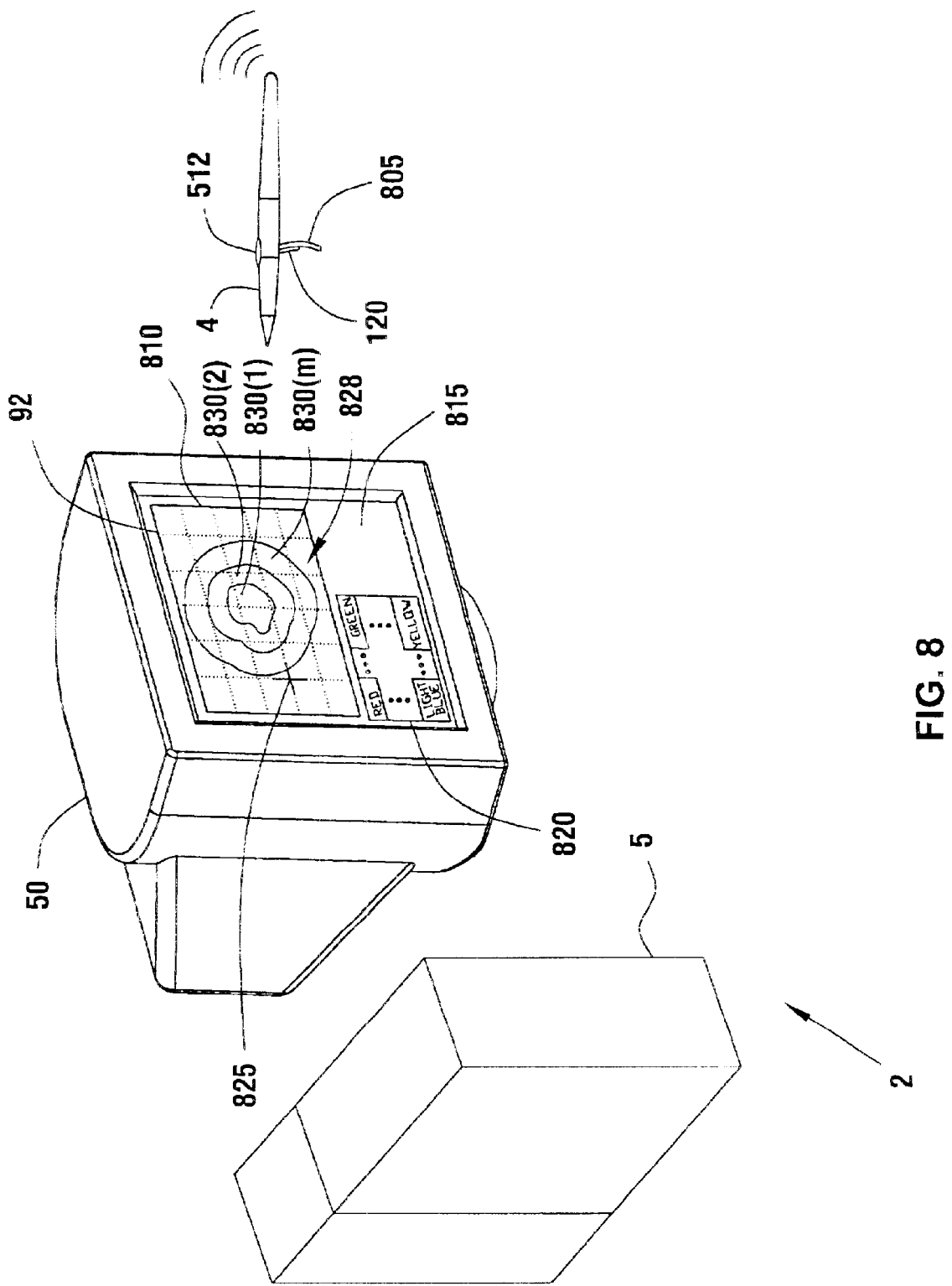
FIG. 8 illustrates an isometric view of the system of FIG. 1, in accordance with one embodiment of the present invention.

Referring now to FIG. 8, an isometric view of the system 2 is illustrated, in accordance with one embodiment of the present invention. The display device 50 is coupled to the processor-based system 5 in the illustrated embodiment, which communicates with the user-input device 4 over a wireless link.

The user-input device 4, in one embodiment, includes a handle 805 for convenient gripping. The activation element 120 in the illustrated embodiment is a trigger button, which may be depressed to any point from its initial state to its fully-depressed state. In one embodiment, the amount of depression may be representative of the intensity by which pixels are illuminated on the display device 50, similar to the effect of conventional airbrushes.

In accordance, with one embodiment of the present invention, a window 810 of the application 85 (see FIG. 1) is illustrated on a desktop or graphical user interface 815 of the display device 50. The window 810 illustrates a symbolic representation 828 of an image that may be created by the user-input device 4. The symbolic representation 828 may include a plurality of grades 830(1–m), signifying a multitude of colors and different shades of colors that may be created using the user-input device 4, in one embodiment. In one embodiment, the application 85 provides a color palette panel 820 from which the user may select one or more desired colors.

In the illustrated embodiment, the grid 92 is provided in the window 810 on the display device 50. In one embodiment, a sensor, such as an optical sensor, in the user-input device 4 may utilize the grid 92 to aid in determining the position of the user-input device 4. In an alternative embodiment, the grid 92 may be provided over the entire display area (as opposed to only the window 810), such that the position of the user-input device 4 is calculated with reference to the size and location of the entire display area, as opposed to only window 810.

In one embodiment, the desired color may be selected using a cursor 825 of the user-input device 4 by maneuvering the cursor over the color palette panel 820 and selecting the desired color. Thus, in one embodiment, the user-input device 4 may behave like a pointing device when positioned outside the window 810 (e.g., over the color palette panel 820) of the application 85, and act like an airbrush when the user-input device 4 is pointing to a location within the window 810.

In another embodiment, the user may select a desired color from a portion of the image shown in the window 810 on the display device 50. That is, in one embodiment, the user may select a particular shade or mixture of color from the image in the window 810 and the use the selected shade in other regions in the window 810 when creating one or more images.

In one embodiment, the user may use the color adjustable element 512 (see FIG. 5) to select from a spectrum of colors to create the image. The color adjustable element 512 may be a dial that may be adjusted to select the desired color from a range of colors.

The above-described methods may be implemented at any variety of software levels, such as at the device driver level, the operating system level, the application level, or any other desirable level. Furthermore, some or all portions of the above-described methods may be implemented in the processor-based system 5 (see FIG. 1), the user-input device 4 (see FIG. 1), or a combination thereof, in accordance with one or more embodiments of the present invention.

The various software layers, routines, or modules described herein may be executable on various processing elements as shown in FIGS. 1, 2, and 5, such as control units 10, 105, and 505. The control units 10, 105, and 505 may include microprocessors or microcontrollers), or other control or computing devices. As utilized herein, a "controller" may refer to either hardware or software or a combination of the two.

The storage units (84—see FIG. 1; 110—see FIG. 2; 507—see FIG. 5) and memory (see 25—see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A user-input device, comprising:
   a housing having a first end and an opposite end;
   a controller to indicate a position of the first end and the opposite end and to cause one or more pixels of a display device to activate based on the indicated position of at least the first end of the housing; and
   an activatable element disposed between the first and opposite ends, the controller to cause the one or more pixels to activate in response to an activation of the activatable element.

2. The user-input device of claim 1, further comprising a first sensor substantially at the first end and a second sensor substantially at the opposite end, the controller to indicate the position of the user-input device based on the signals sensed by the first and second sensors.

3. The user-input device of claim 2, wherein the first and the second sensors are transducers.

4. The user-input device of claim 1, wherein the controller is coupled to transmit the position of the first end of the housing to a processor-based system.

5. The user-input device of claim 1, wherein the controller is coupled to indicate the orientation of the housing to a processor-based system.

6. The user-input device of claim 5, wherein the controller is coupled to cause the one or more pixels to be activated based on the orientation of the housing.

7. The user-input device of claim 1, wherein the controller is coupled to allow a selection of a color and wherein the controller is coupled to cause the one or more pixels to be activated with the selected color in response to the activation of the activatable element.

8. The user-input device of claim 1, wherein the controller is coupled to cause the one or more pixels to be activated in an airbrush-like manner based on the position of the first end.

9. A method, comprising:
   determining, in a user-input device, a distance of a first end and a second end of the user-input device relative to a display device; and
   activating one or more pixels of the display device based on the distance of the first and second ends of the user-input device relative to the display device.

10. The method of claim 9, comprising receiving information regarding an angle of the first end of the user-input device relative to the display device.

11. The method of claim 9, comprising determining the distance of the user-input device relative to the display device using triangulation.

12. The method of claim 9, further comprising determining an orientation of the user-input device relative to the display device.

13. The method of claim 12, further comprising activating the one or more pixels based on the orientation of the user-input device.

14. An article comprising one or more machine-readable storage media containing instructions that when executed enable a processor to:
   determine a position of a first end and a second end of a user-input device via a controller in the user-input device;
   detect an activation of an activatable element; and
   illuminate one or more pixels of a display device based on the position of the user-input device and the activation of the activatable element.

15. The article of claim 14, wherein the instructions when executed enable the processor to determine an orientation of the user-input device.

16. The article of claim 15, wherein the instructions when executed enable the processor to determine the speed of the user-input device as it is moved.

17. The article of claim 16, wherein the instructions when executed enable the processor to illuminate the one or more pixels based on at least one of the orientation and speed of the user-input device.

18. The article of claim 14, wherein the instructions when executed enable the processor to provide at least one of sound, air and light in response to the activation of the activatable element.

19. The article of claim 14, wherein the instructions when executed enable the processor to control the intensity of the illumination based on the amount of depression of the activatable element.

20. The article of claim 14, wherein the instructions when executed enable the processor to determine the position of the user-input device using triangulation.

21. The article of claim 14, wherein the instructions when executed enable the processor to determine the position of the user-input device based on an identifiable marking on the display device.

22. A system, comprising:
   a user-input device comprising a controller to receive one or more signals from a plurality of sensors located on a display device of a processor-based system, transmit information to the processor-based system regarding a position of the user-input device, and cause one or more pixels of the display device to activate based on the transmitted information.

23. The system of claim 22, wherein tile controller is coupled to transmit information to the processor-based system regarding at least one of orientation and speed of the user-input device.

24. The system of claim 23, wherein the controller is coupled to cause the one or more pixels to activate based on at least the transmitted information regarding the orientation and speed of the user-input device.

25. A digital airbrush peripheral, comprising:
   a housing;
   a display coupled to the housing, to indicate a currently active digital paint color;
   an activatable element coupled to the housing, to activate the digital airbrush peripheral;
   a control unit to cause air to be generated in response to an activation of the activatable element;
   an interface coupled to the activatable element, to communicate information regarding the activatable element to a data processing device; and
   a processor to generate one or more sounds in response to a selection of the activatable element.

26. The digital airbrush peripheral of claim 25, comprising an air generator to generate air in response to a selection of the activatable element.

27. The digital airbrush peripheral of claim 25, comprising one or more sensors to sense information regarding the position of the digital airbrush peripheral.

28. The digital airbrush peripheral of claim 25, wherein the processor to cause a light to be emitted from the digital airbrush peripheral, wherein the light indicates the color of digital paint.

29. The digital airbrush peripheral of claim 25, wherein the activatable element is coupled to control an intensity of a digital spray on the display.

* * * * *